(12) United States Patent
Gokhale

(10) Patent No.: US 9,124,889 B2
(45) Date of Patent: Sep. 1, 2015

(54) HIGH FREQUENCY EMPHASIS IN CODING SIGNALS

(71) Applicant: Intel Corporation, Santa Clara, CA (US)

(72) Inventor: Neelesh N. Gokhale, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/529,058

(22) Filed: Oct. 30, 2014

(65) Prior Publication Data

US 2015/0110175 A1 Apr. 23, 2015

Related U.S. Application Data

(63) Continuation of application No. 13/455,057, filed on Apr. 24, 2012, now Pat. No. 8,902,974, which is a continuation of application No. 10/988,873, filed on Nov. 15, 2004, now Pat. No. 8,223,844.

(60) Provisional application No. 60/520,163, filed on Nov. 14, 2013.

(51) Int. Cl.
| | |
|---|---|
| *H04N 7/12* | (2006.01) |
| *H04N 19/124* | (2014.01) |
| *H04N 19/176* | (2014.01) |
| *H04N 19/50* | (2014.01) |

(52) U.S. Cl.
CPC ........... *H04N 19/124* (2014.11); *H04N 19/176* (2014.11); *H04N 19/50* (2014.11)

(58) Field of Classification Search
CPC . H04N 19/117; H04N 19/124; H04N 19/126; H04N 19/13; H04N 19/136; H04N 19/176; H04N 19/18; H04N 19/426; H04N 19/44; H04N 19/82; H04N 19/86
USPC ...................................................... 375/240.03
See application file for complete search history.

(56) References Cited

U.S. PATENT DOCUMENTS

| | | | |
|---|---|---|---|
| 5,243,428 A | 9/1993 | Challapali et al. | |
| 5,369,439 A | 11/1994 | Matsuda et al. | |
| 5,455,629 A | 10/1995 | Sun et al. | |
| 5,872,866 A * | 2/1999 | Strongin et al. | ............. 382/233 |
| 6,002,801 A | 12/1999 | Strongin et al. | |
| 6,175,650 B1 | 1/2001 | Sindhu et al. | |
| 6,687,412 B1 * | 2/2004 | Rao et al. | ...................... 382/251 |

(Continued)

OTHER PUBLICATIONS

Office Action received for U.S. Appl. No. 10/988,873 mailed on Jul. 9, 2008, 21 pages.

*Primary Examiner* — Jessica M Prince
(74) *Attorney, Agent, or Firm* — AEON Law; Adam L.K. Philipp

(57) ABSTRACT

A decoder adapted to generate an intermediate decoded version of a video frame from an encoded version of the video frame, determine either an amount of high frequency basis functions or coefficients below a quantization threshold for at least one block of the video frame, and generate a final decoded version of the video frame based at least in part on the intermediate decoded version of the video frame and the determined amount(s) for the one or more blocks of the video frame, is disclosed. In various embodiments, the decoder may be incorporated as a part of a video system.

13 Claims, 12 Drawing Sheets

(56) References Cited

U.S. PATENT DOCUMENTS

| | | |
|---|---|---|
| 7,079,697 B2 | 7/2006 | Zhou |
| 7,174,047 B2 * | 2/2007 | Lin et al. .................. 382/250 |
| 7,444,029 B2 * | 10/2008 | Shen et al. ................ 382/238 |
| 8,116,373 B2 * | 2/2012 | Base et al. ............ 375/240.02 |
| 2003/0026478 A1 | 2/2003 | Jones et al. |
| 2003/0099292 A1 | 5/2003 | Wang et al. |
| 2005/0074062 A1 | 4/2005 | Sung et al. |
| 2008/0037631 A1 | 2/2008 | Hong |

\* cited by examiner

|     |     |     |     |
|-----|-----|-----|-----|
| C₀  | C₁  | C₅  | C₆  |
| C₂  | C₄  | C₇  | C₁₂ |
| C₃  | C₈  | C₁₁ | C₁₃ |
| C₉  | C₁₀ | C₁₄ | C₁₅ |

Fig.4a.

|  2  |  1  | -1  | -2  |
|-----|-----|-----|-----|
|  1  |  0  |  0  | -1  |
| -1  |  0  |  0  |  1  |
| -2  | -1  |  1  |  2  |

Fig.4b.

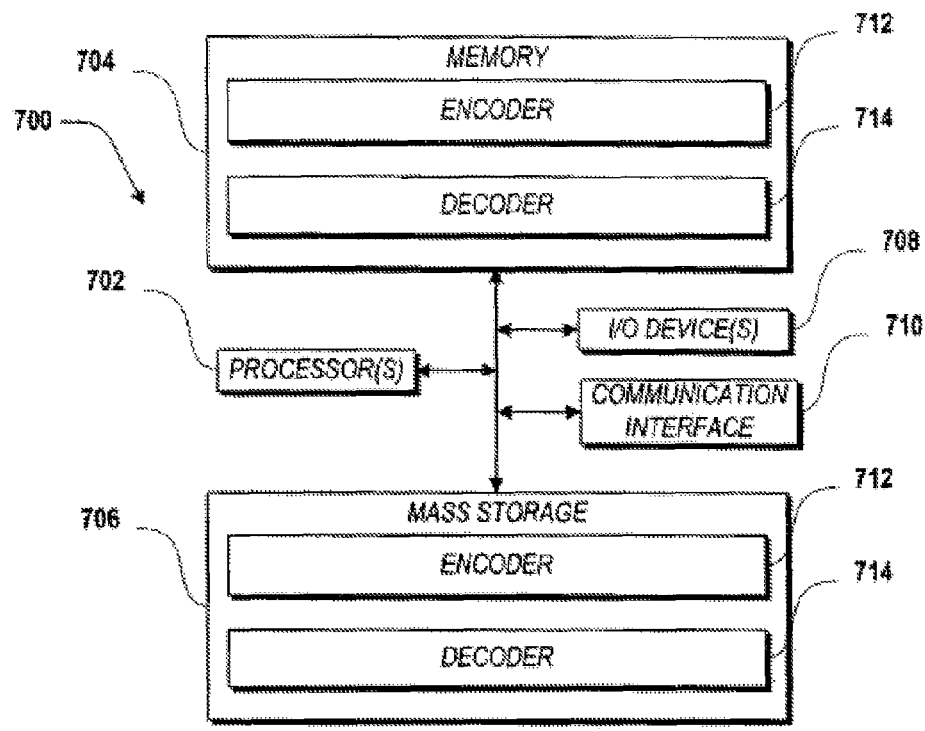
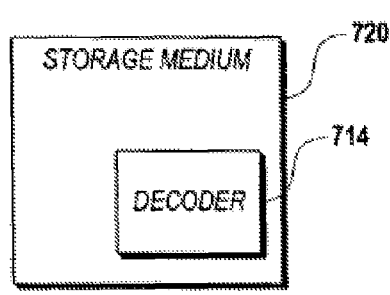 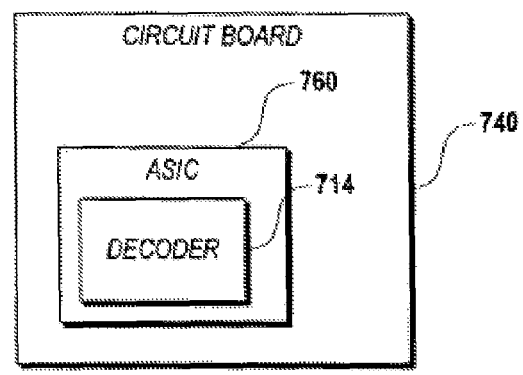
Fig. 10a
Fig. 10b
Fig. 10c

HIGH FREQUENCY EMPHASIS IN CODING SIGNALS

RELATED APPLICATION

The present application is a Continuation of U.S. patent application Ser. No. 13/455,057, filed Apr. 24, 2012, titled "HIGH FREQUENCY EMPHASIS IN CODING SIGNALS", and naming inventor Neelesh N. Gokhale. U.S. patent application Ser. No. 13/455,057, claims the benefit of priority to U.S. patent application Ser. No. 10/988,873 filed Nov. 14, 2004 and issued as U.S. Pat. No. 8,223,844 on Jul. 17, 2012, titled "HIGH FREQUENCY EMPHASIS IN CODING SIGNALS", and naming inventor Neelesh N. Gokhale. U.S. Pat. No. 8,223,844, claims the benefit of priority to U.S. Provisional Application No. 60/520,163, filed Nov. 15, 2003, and titled "HIGH FREQUENCY EMPHASIS IN CODING SIGNALS", and naming inventor Neelesh N. Gokhale. The above-cited applications are incorporated by reference in their entireties as if fully set forth herein and for all purposes.

FIELD OF THE INVENTION

The present invention relates to the field of encoding and decoding of digital signals. More specifically, the present invention is related to video and image coding/decoding.

BACKGROUND OF THE INVENTION

Advances in microprocessor and video related technologies have led to wide spread deployment and adoption of numerous types of audio, video and imaging devices. Examples of such devices include but are not limited to digital cameras, camcorders, MP3 players, digital versatile disk (DVD) players, video enabled laptop and desktop computing devices as well as servers, and so forth.

Advances in networking, telecommunication, satellite and other related technologies have also led to increase in on demand and/or real time online delivery of audio and video information, including delivery over public networks, such as the Internet.

Whether videos are delivered offline (e.g. from a DVD player) or online (e.g. from a video server), high quality audio or video inherently requires a high volume of data. Thus, audio and video delivery and rendering often involve encoding and decoding to reduce the amount of data to be stored, retrieved and/or transmitted.

Additionally, Video Codecs employing schemes like Deblocking Filter and B-Frames have a tendency to attenuate certain spectral information in the video. For example, Deblocking Filter can smoothen out certain frequencies and B-Frame skipped mode can hurt the high frequencies present in Video. Also small transform sizes and/or high quantizers may not be able to capture certain spectral information during video coding.

BRIEF DESCRIPTION OF THE DRAWINGS

FIG. 4a illustrates a highest frequency determining ZigZag scan practiced in various embodiments.

FIG. 4b illustrates an exemplary Basis Function C4 of Strength 2.

FIGS. 10a-10c illustrate various embodiments of the present invention.

DETAILED DESCRIPTION OF EMBODIMENTS OF THE INVENTION

Embodiments of the present invention includes a video decoder, devices equipped with these decoders, systems made up of such devices, and methods of operations of these elements, devices and systems, and related subject matters.

Figure 1:
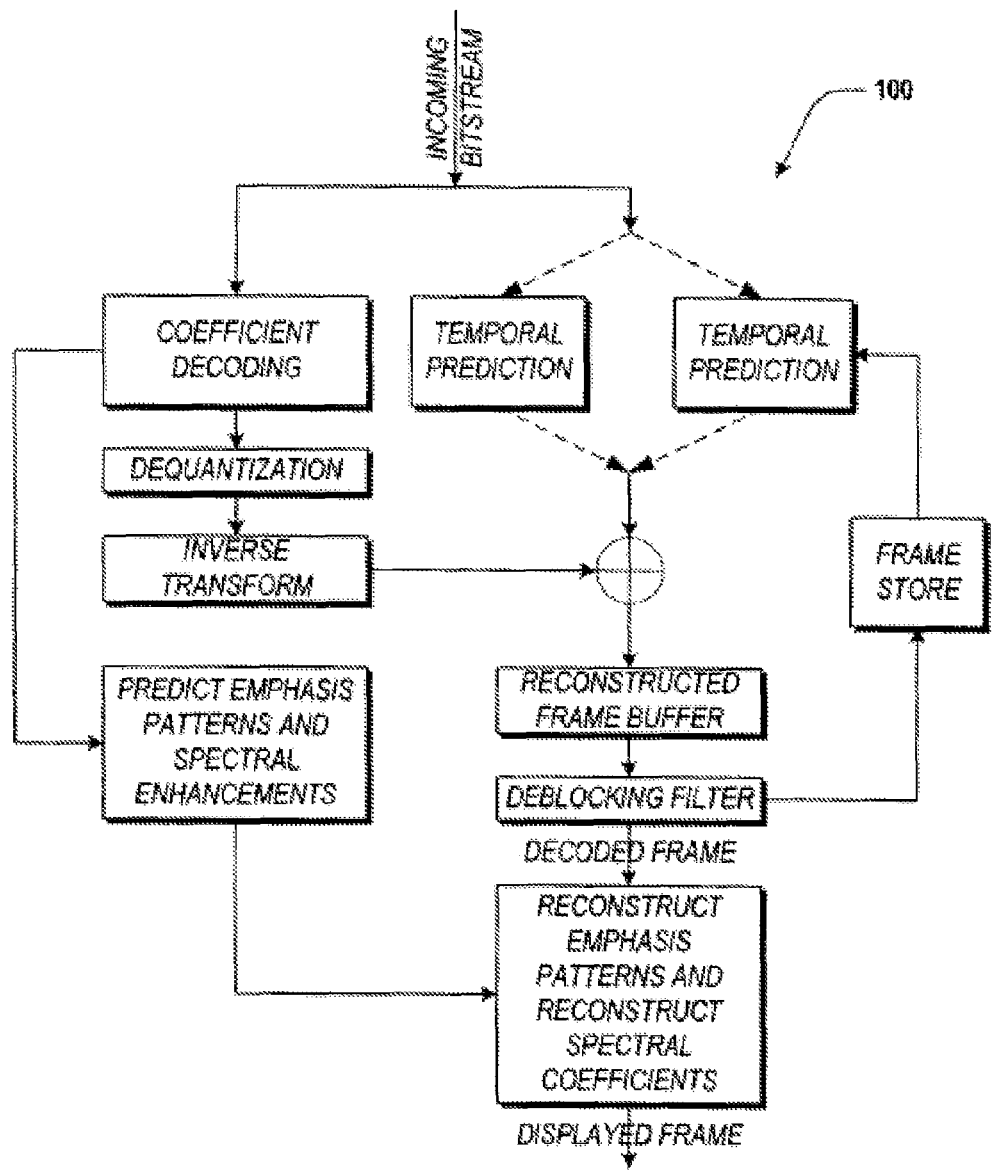
FIG. 1 illustrates a block diagram of a prior art video processing system.

A prior art video processing system 100 is illustrated in FIG. 1. More specifically, the decoding section of video processing system 100 is illustrated. For the illustrated embodiment, Video Codecs employ schemes like Deblocking Filter and B-Frames. As will be appreciated by those skilled in the art, Video Codecs have a tendency to attenuate certain spectral information in the video. For example Deblocking filter can smoothen out certain frequencies and B-Frame skipped mode can hurt the high frequencies present in Video.

Additionally, as typical of conventional Video Codecs, its inverse transformation and dequantization units operate with small transform sizes and/or high quantizers. Thus, Video Codecs may not be able to capture certain spectral information during video coding.

The terms Video Codecs, Deblocking Filter, B-Frame, B-Frame skipped mode, transformation, quantizers, high frequency, I-Frame, P-Frame, quantization parameters, basis function, and so forth, are all used in this specification in accordance with their plain meaning as understood by those of ordinary skill in the art of video signal processing, in particular, consistent with the meaning of these terms as they are used in ITU video signal processing standards. [ITU=International Telecommunication Union.]

However, as will be described in more detail below, in various embodiments of the present invention, High Frequency Emphasis (HFE) is employed to correct and further enhance the recovered video. HFE adds back spectral information lost or attenuated in video coding. More specifically, in various embodiments, HFE is implemented as a post filter which, Adds a calculated amount of certain high frequency basis function actually transmitted in the bitstream with the video frames.

Adds a calculated amount of high frequency basis functions predicted from coefficients transmitted in the current block or the past or future frame.

Figure 2A:
FIG. 2a illustrates a frame image without the High Frequency Emphasis (HFE) enhancements.

FIG. 2a illustrates a frame image without the HFE enhancements.

Figure 2B:
FIG. 2b illustrates a frame image with the HFE enhancements with Amplified Basis functions that add texture back to the frame.

FIG. 2b illustrated a frame image with the HFE enhancements with Amplified Basis functions that add texture back to the frame.

Figure 3A:
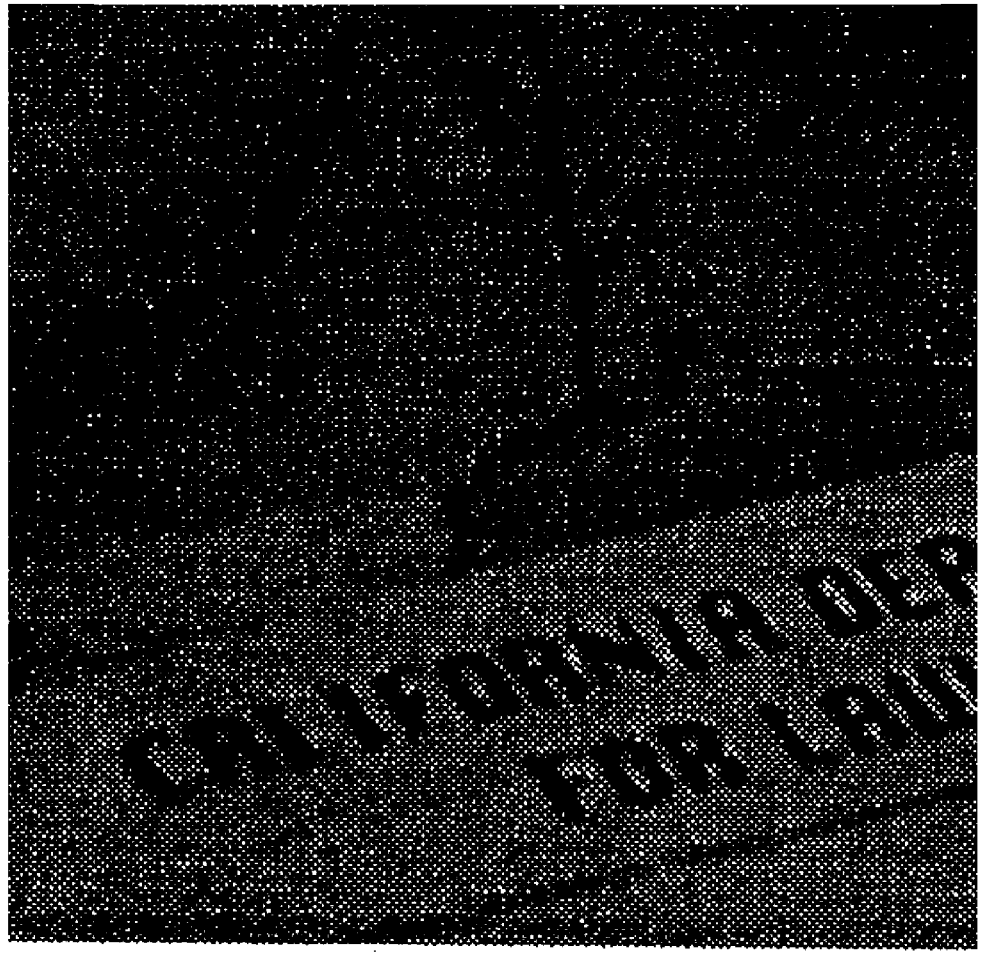
FIG. 3a illustrates a frame image with the HFE enhancements.
Figure 3B:
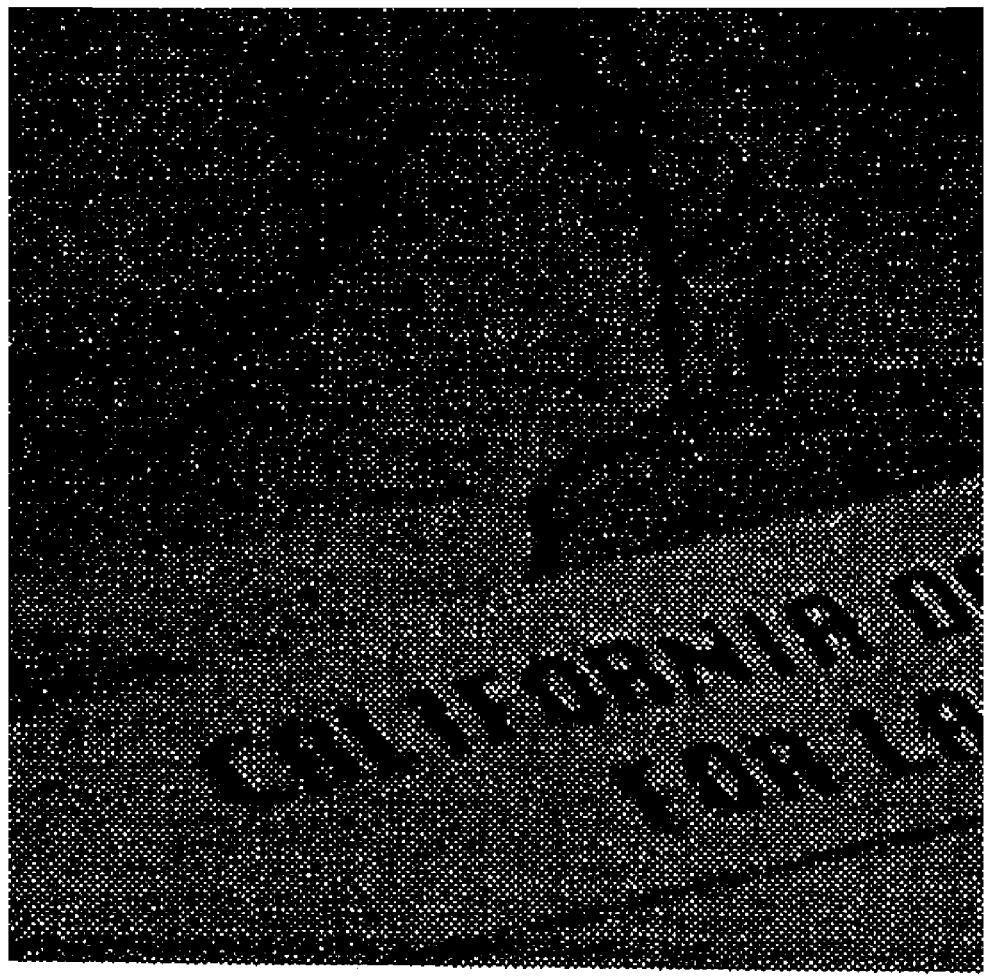
FIG. 3b illustrates a frame image without the HFE enhancements.

As a further example, the HFE enhanced video frame of FIG. 3a has more texture than the unenhanced video frame of FIG. 3b.

liP Frame HFE

In various embodiments, a video frame to be decoded with HFE may be an 1-Frame or a P-Frame, and the liP Frame is decoded and enhanced by performing the followings on one or more blocks (e.g. each block) of the 1/P Frame:

The highest transmitted coefficient (HC), i.e., highest frequency, of the block is determined. In various embodiments, the transmitted coefficients of the block is analyzed using the ZigZag scan as shown in FIG. 4a.

In various embodiments, coefficients C6, C9, C13, and C14 (shaded boxes) are excluded from consideration, when determining the highest frequency coefficient. The exclusion is motivated by the deblocking filter having a tendency to smooth out the edges of the block and not the center. Resultantly, coefficients C6, C9, C13, and C14 of FIG. 4a have basis functions which mostly effect the center pixels.

In various embodiments, the strength of the correction to be applied is also determined. In some of these embodiments, QP (quantization parameter) is employed to limit its strength. For example, in various embodiment, the strength of the correction may be limited by QP as follows:

$0<=QP<9$: strength=0
$9<=QP<13$: strength=1
$13<=QP<18$: strength=2
$18<=QP<32$: strength=3

In various embodiments, the determined basis functions for a block are added to the corresponding block of an intermediate decoded version of the video frame, in view of the determined HC and the Strength. FIG. 4b illustrates an example Basis Function C4 of Strength 2.

B-Frame HFE

In various embodiments, a video frame to be decoded with HFE may be a 8-Frame, and the 8-Frame is decoded and enhanced by performing the followings on one or more ocks (e.g. each block) of the 8-Frame:

In various embodiments, if the block has any transmitted coefficient, the same HFE scheme as was used with the liP Frame is used.

In various embodiments, in the case of a Skipped MB, there are no transmitted coefficients. The Skipped MB is reconstructed as the weighted average of temporally co-located blocks. More specifically, the HC and QP for the Skipped MB are determined from the nearest temporally co-located blocks (e.g. adjacent ones).

In various embodiments, HFE also addresses the fact that Video Codecs inherently involves quantizing some frequency coefficients to zero. Further, high frequencies are quantized to zero more often, because a typical video distribution has high energy in low frequencies and lesser energy in high frequencies.

Figure 5A:
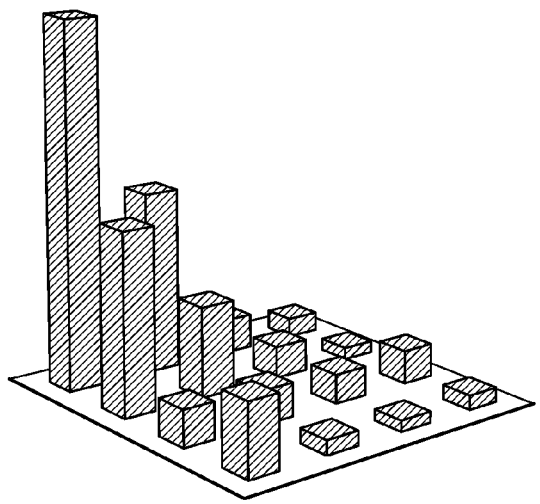
FIGS. 5a-5c illustrate transform coefficients of a video frame before quantization, after dequantization without HFE enhancement, and after dequantization with HFE enhancement.
Figure 5B:
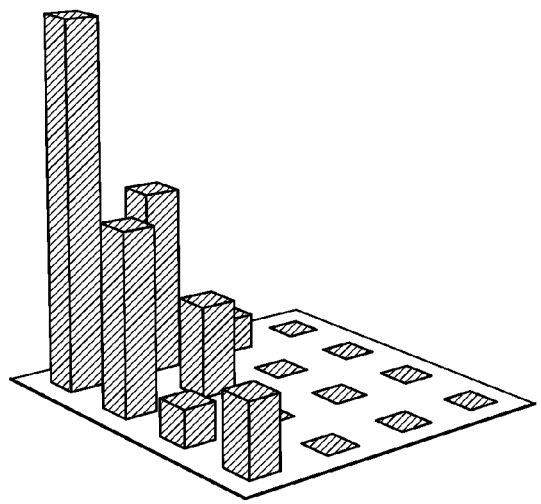
Figure 5C:
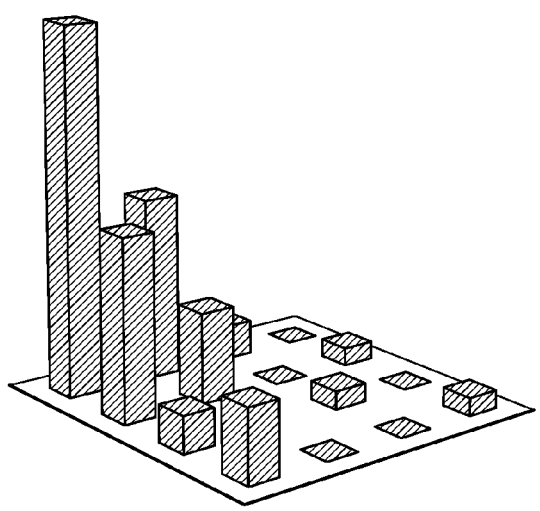

FIGS. 5a-5c illustrate the transform coefficients of an example video frame, the same of a dequantized version of the video frame without HFE, and the same with HFE restoring some or all of the high frequencies quantized to zero.

In various embodiments, HFE restores some or all of the high frequencies quantized to zero as follows;

It inserts High Frequency Coefficients which statistically look similar to the coefficients which are quantized to zero.

In various embodiments, statistics are generated for various contexts in the bitstream, and applied on a context basis. Examples of contexts may include, but are not limited to 1> QP
2> Macroblock Type
3> Last Significant coefficient in a Zig Zag Scan
4> Picture Type
5> Frequencies in the temporally co-located block.

Figure 6A:
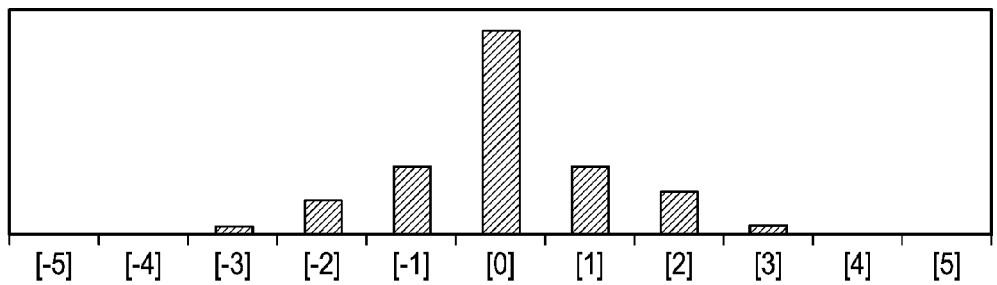
FIGS. 6a-6c illustrate distributions of exemplary statistics employed for HFE, in various embodiments.
Figure 6B:
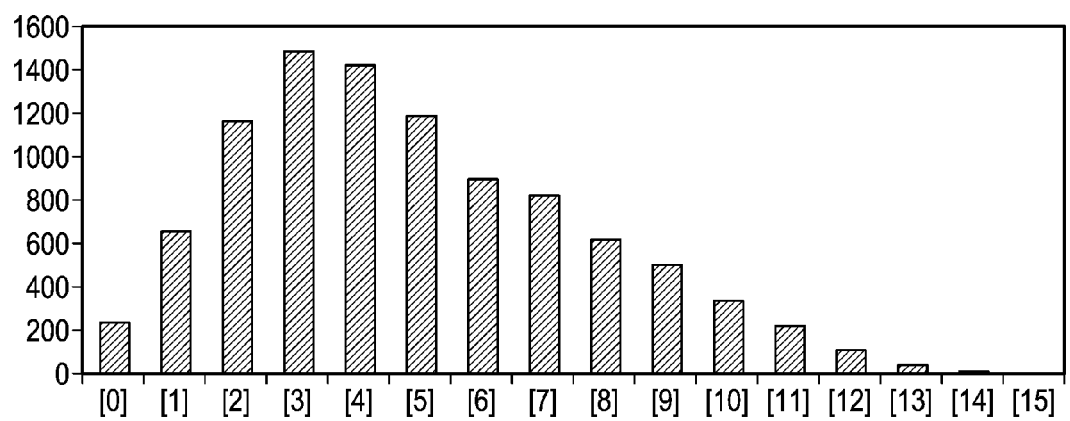
Figure 6C:
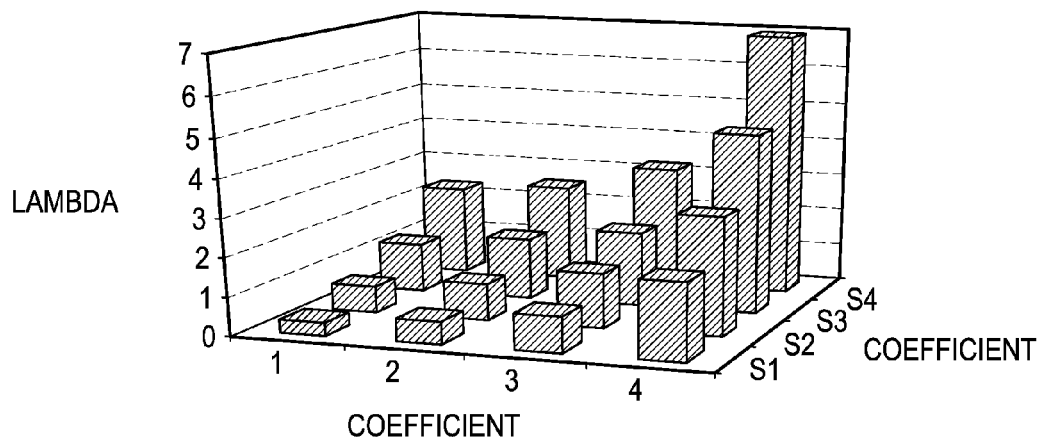

FIGS. 6a-6c illustrate distributions of a number of statistics which may be employed. More specifically, FIG. 6a illustrates a distribution of coefficient levels of Zero Quantized Coeffs, i.e. quantized to zero, whereas FIG. 6b illustrates a distribution of the number of such coefficients quantized to 0 per block. FIG. 6c illustrates distribution of coeff levels quantized to zero of each coefficient represented as Lambda of a ideal Laplacian distribution.

Figure 7A:
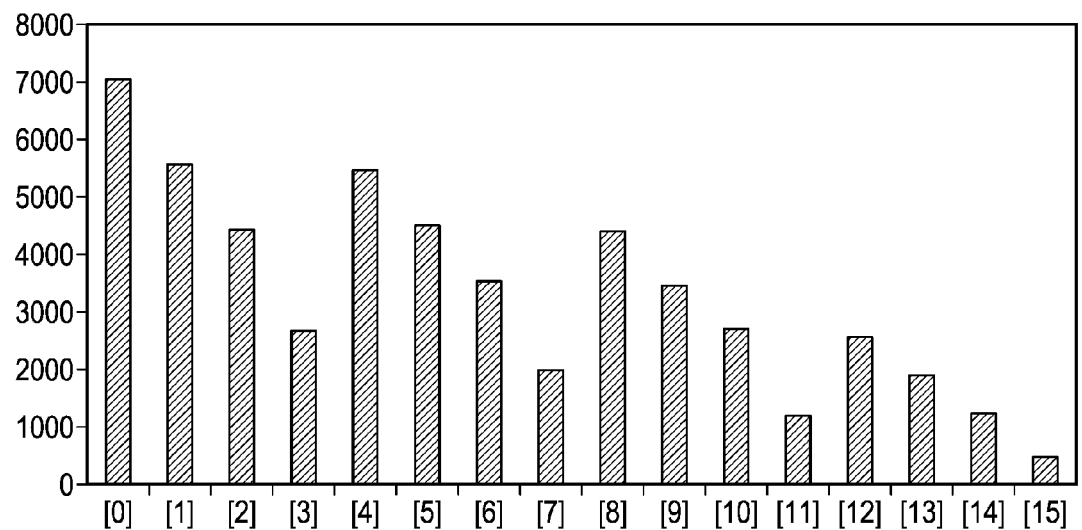
FIGS. 7a-7b illustrate various exemplary statistics determined for an exemplary context, for various embodiments.
Figure 7B:
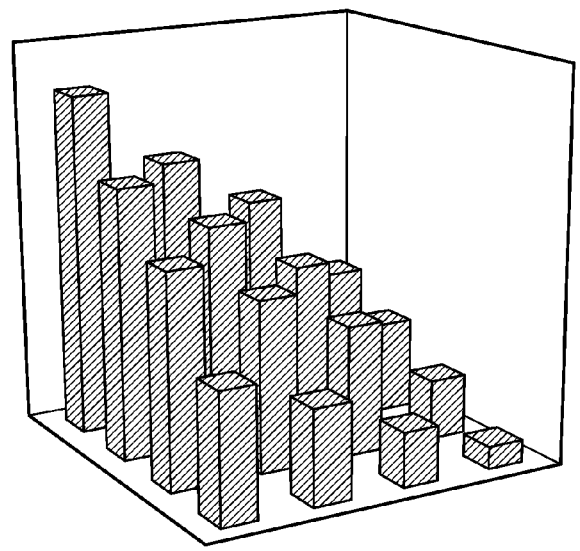

FIGS. 7a-7b illustrate distributions of a number of statistics, which may be employed. More specifically, FIGS. 7a-7b illustrate an Average Distribution of Number of Zero Quantized Coeffs for an exemplary context, which is "given block is not code in an 1-Frame", in a 1-D and a 2-D view, respectively.

Depending on implementations, in various embodiments, one or more statistics is maintained for one or more contexts. An example of another context is the context of DC or Low Frequencies Coded in residue of an 1-Frame. As those skilled in the art would appreciate, embodiments of the present invention may be practiced with one or more selected statistics for one or more selected contexts.

Results and Applications:

Experience has shown that the use of embodiments of the present invention of HFE with an encoder may increase the average PSNR of the encoder by 0.05 dB and minimum PSNR by 0.15 dB. Since HFE is generally considered to be visually pleasing, stronger HFE schemes may also be practiced in other embodiments. However, the strong HFE schemes may degrade PSNR. [PSNR=Peak Signal-to-Noise Ratio.]

In various embodiments, HFE may be used as a post processing stage for decoders, such as ITU H264 compliant decoders.

Figure 8:
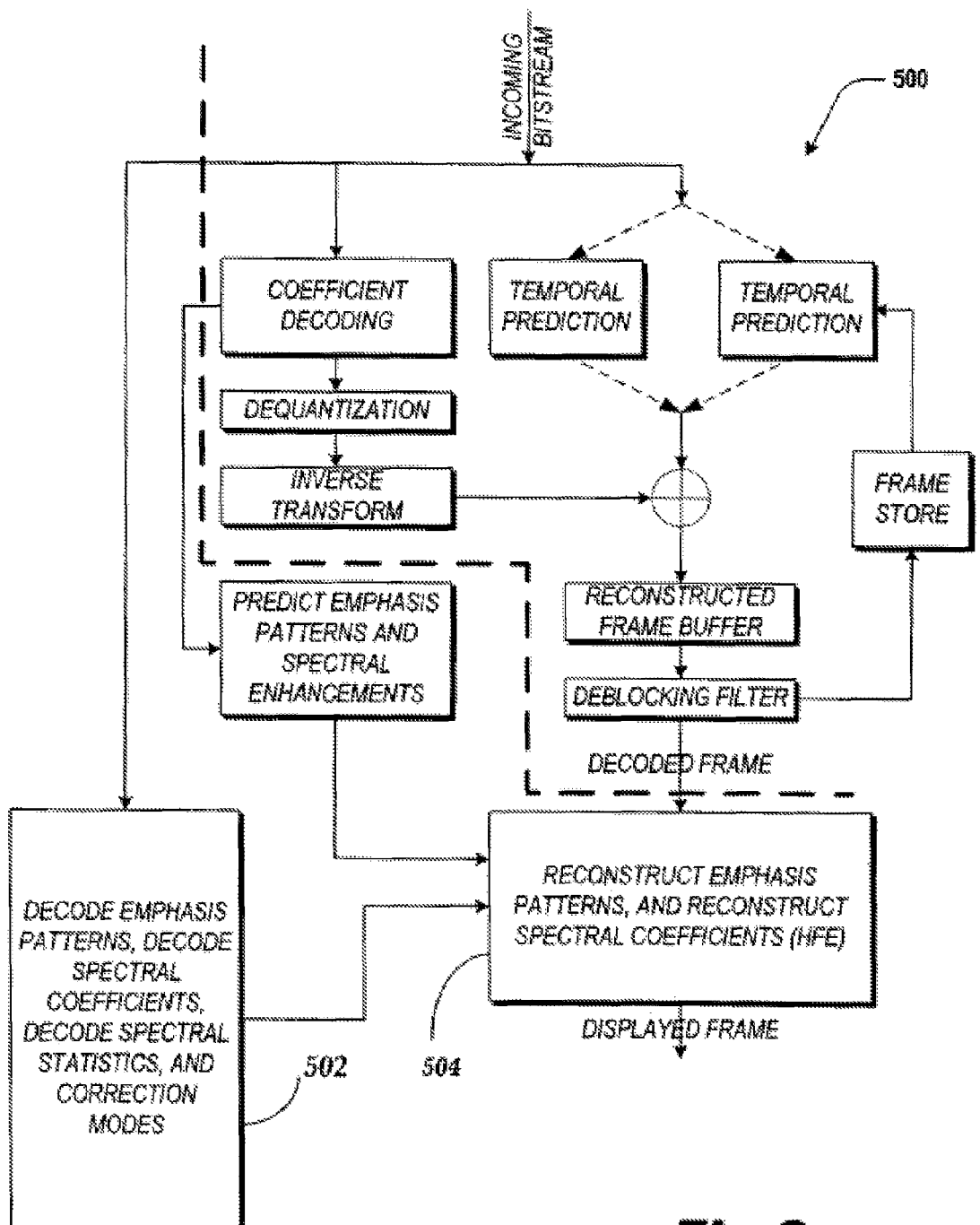
FIG. 8 illustrates a block diagram of an HFE video processing system, in accordance with various embodiments.

A block diagram of one decoder embodiment 500 of the present invention is illustrated in FIG. 8. For the illustrated embodiment, decoder 500 includes similar conventional elements as decoder 100 of FIG. 1, e.g. a dequantization unit, an inverse transformation unit, a eblocking filter unit, and so forth. However, decoder 500 further includes a HFE unit 502 adapted to practice the HFE operations described earlier. Further, reconstruct unit 504 is further adapted to additionally enhance an initially decoded video frame to generate the final decoded video frame. in accordance with the HFE specified by HFE unit 502.

While for ease of understanding, HFE and reconstruction units 502-504 are each illustrated as a single unit, in alternate embodiments, their functions may be implemented in one or more units. Further, the various units may be implemented in hardware, using ASIC or reconfigurable IC, or in software, in C or other suitable system programming languages. [ASIC=Application Specific Integrated Circuit]

The term "initially decoded video frame" refers to the input decoded video frame of the reconstruction unit 504, whereas the term "finally decoded video frame" refers the output decoded video frame of the reconstruction unit 504. The input decoded video frame of the reconstruction unit 804 is also referred to as the intermediate decoded video frame.

Experience also has shown that HFE post processing, with or without sideband information, can improve an existing codec. The above system can be used to improve the quality of a given codec without requiring modification to the underlying bitstream. The spectral information can be predicted or coded separately as sideband information.

Embodiments of the present invention could be an effective scheme to improve upon the codec without changing the underlying bitstream.

System

Figure 9:
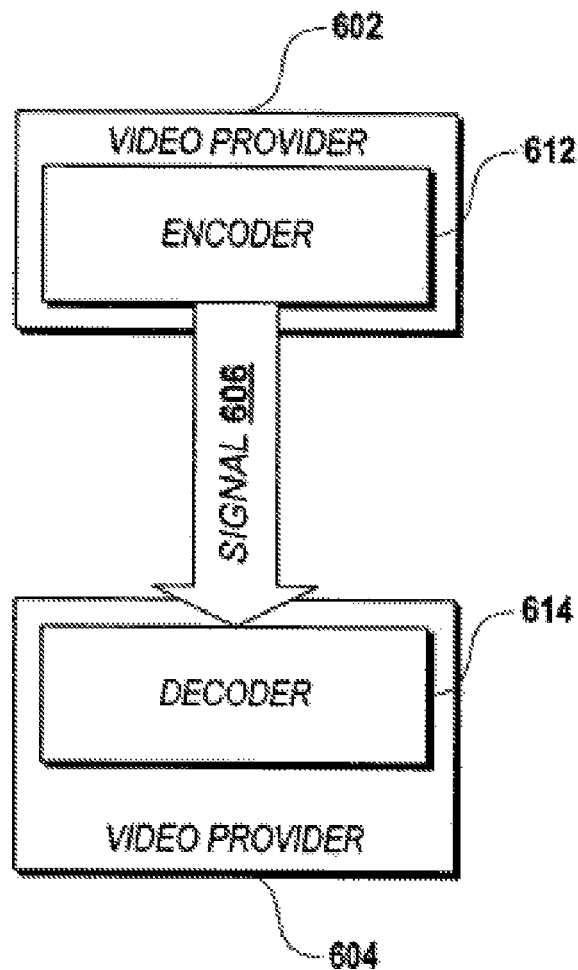
FIG. 9 illustrates an example system having a video sender device and a video receiver device incorporated with teachings of the present invention, in accordance with one embodiment.

FIG. 9 illustrates an overview of an example system incorporated with teachings of the present invention, in accordance with one embodiment. As illustrated, for the embodiment, example system 600 includes video sender 602 and video receiver 604 communicatively coupled to each other as shown. Video sender 602 includes in particular encoder 612, while video receiver 604 includes in particular decoder 614.

Video sender 602 provides an encoded video signal 606 to video receiver 604, using encoder 612 to encode the video. Further, decoder 614 advantageously includes hardware and/or software components incorporated with the HFE teachings of the present invention.

Video receiver 604 receives the encoded video 606, decodes the video using decoder 614 with HFE, and renders the decoded video for consumption by one or more users of video receiver 604. Accordingly, video receiver 604 may also be referred to as a video renderer. For the purpose of the present application, the two terms may be considered interchangeable, unless the context clearly indicates to the contrary.

For the purpose of the present application, as described earlier, a slice of a video is an integer number of macroblocks of a video. A video includes a number of pictures, each including a number of fields or frames, with each field or frame including a number of slices of macroblocks. Each macroblock includes a number of blocks of pixels.

Except for the fact that decoder 614 is advantageously provided with hardware and/or software components adapted to decode video signals with HFE in accordance with an embodiment of the present invention, video server 602, including encoder 612, and video receiver 604 represent a broad range of these elements known in the art or to be designed. Different embodiments may employ different implementations of these elements.

Further, video server 602 and video receiver 604 may be communicatively coupled to each other via any one of a number of wire based and/or wireless connections. For examples, the connection may be a bus connection (such as a Universal Serial Bus connection) or a wired local area network connection (such as an Ethernet connection). As a further example, the connection may also be a combined wireless and wired wide area network connection (such as a TMDA or COMA wireless connection between video sender 602 or video receiver 604 and a base station at one end, and a wire based ATM connection from the base station to the other end). [TDMA=Time Division Multiple Access, COMA=Code Division Multiple Access, and ATM=Asynchronous Transfer Mode.]

Example Embodiments Including Decoder 500 of FIG. 8

FIGS. 10*a*-10*c* illustrate various embodiments incorporated with decoder 500 of FIG. 8. More specifically, FIG. 10*a* illustrates an example digital system incorporated with a software implementation of encoder 712 and decoder 714 (based on decoder 500 of FIG. 8). For the embodiment, example digital system 700 includes processor 702, memory 704, mass storage 706, 1/0 devices 708, and communication interface 710 coupled to each other and a (set of bridged) bus(es) as shown.

Memory 704 and mass storage 706 may be employed store a working and a persistent copy of a software implementation of encoder 712 and decoder 714. Except for its usage, memory 704 and mass storage 706 may respectively be any one of a number of storage elements known in the art or to be designed.

Processor 702, 110 devices 708, communication interface 710 and the bus(es) represent a broad range of the respective elements known in the art or to be designed.

In various embodiments, digital system 700 may be a wireless mobile phone, a personal digital assistant, a palm-sized computing device, a laptop computing device, a tablet computing device, a desktop computing device, a set top box, a server, an entertainment unit, a DVD player, a digital camera, a television, a display monitor, and other computing devices of the like.

FIG. 10*b* illustrates an article of manufacture having storage medium 720 and a software implementation of decoder 714 stored therein. Stored decoder 714 may be employed to program and enable an apparatus to decode encoded video with HFE as earlier described. The apparatus may e.g. be digital system 700 of FIG. 10*a*.

In various embodiments, article 720 may e.g. be a diskette, a compact disk (CD), a DVD (digital versatile disk) or other computer readable medium of the like. In other embodiments, article 720 may be a distribution server distributing encoder 712 and/or decoder 714 on line, via private and/or public networks, such as the Internet. In one embodiment, article 720 is a web server.

FIG. 10*c* illustrates a circuit board embodiment, where circuit board 740 includes an ASIC 760 having a number of hardware implementations of a decoding unit. ASIC 760 may be employed to form e.g. a DVD player, a digital camera, an entertainment unit, a set-top box and so forth.

In alternate embodiments, the decoding units may be disposed in multiple ASICs 760 instead.

Alternate Embodiments

While the present invention has been described with the above illustrative embodiments, including the example video system of FIG. 9, and various embodiments of the video decoder of FIGS. 10*a*-10*c*. The invention is not so limited. It may be modified and/or enhanced consistent with the scope of the invention defined by the claims to follow.

What is claimed is:

1. A method comprising:
    generating an intermediate decoded version of a video frame from an encoded version of the video frame;
    determining an amount of high frequency basis function for at least one block of the video frame based at least in part on a determined highest transmitted coefficient for the block;
    determining an application strength for the block, based at least in part on a quantization parameter; and
    generating a final decoded version of the video frame based at least in part on the intermediate decoded version of the video frame and by adding, based on the determined application strength for the block, the determined amount of high frequency basis function for the block to the corresponding block of the intermediate decoded version of the video frame.

2. The method of claim 1, wherein the method further comprises receiving the encoded version of the video frame as a part of a bit stream, including the high frequency basis functions of the block.

3. The method of claim 1, wherein the method further comprises predicting the high frequency basis function for the block, based at least in part on an amount of transmitted coefficients for the block, a past video frame, or a future video frame.

4. The method of claim 1, wherein the determining of a highest transmitted coefficient for the block comprises excluding one or more transmitted coefficients of the block from consideration.

5. The method of claim 1, wherein the video frame is either an I-frame or a P-frame.

6. The method of claim 1, wherein the video frame is a B-frame, and the block comprises transmitted coefficients.

7. The method of claim 1, wherein the video frame is a B-frame; the block is a skipped macroblock of the B-frame with no transmitted coefficients; and the method further comprises estimating transmitted coefficients for the skipped macroblock, based on one or more temporally co-located blocks of B-frame.

8. The method of claim 1, further comprising determining an amount of coefficients below a quantization threshold for a block of the video frame, based at least in part on one or more statistics; and the adding comprises adding the determined amount of coefficients below a quantization threshold for the block, to the corresponding block of the intermediate decoded version of the video frame.

9. The method of claim 8, wherein the method further comprises determining the statistics, and the statistics comprise one or more selected from the group consisting of a quantization parameter of the video frame, a macroblock type of a macroblock, a least significant coefficient of the block, a picture type of a picture comprising the video frame, and a frequency in a temporally co-located block of the block.

10. A decoder comprising
means for generating an intermediate decoded version of a video frame from an encoded version of the video frame;
means for determining an amount of high frequency basis function for at least one block of the video frame based at least in part on a determined highest transmitted coefficient for the block
means for determining an application strength for the block, based at least in part on a quantization parameter; and
means for generating a final decoded version of the video frame based at least in part on the intermediate decoded version of the video frame and by adding, based on the determined application strength for the block, the determined amount of high frequency basis function for the block to the corresponding block of the intermediate decoded version of the video frame.

11. The decoder of claim 10, wherein the means for determining is adapted to exclude one or more transmitted coefficients for block from consideration, when determining a highest transmitted coefficient for the block.

12. The decoder of claim 10, further comprising means for estimating transmitted coefficients for a skipped macroblock of the video frame, based on one or more temporally co-located blocks of the video frame, when the video frame is a B-frame without transmitted coefficients.

13. The decoder of claim 10, wherein the means for determining is adapted to determine an amount of coefficients below a quantization threshold for a block of the video frame, based at least in part on one or more statistics; and the means for generating the final version is adapted to add the determined amount of coefficients below a quantization threshold for the block, to the corresponding block of the intermediate decoded version of the video frame.

* * * * *